2,753,011

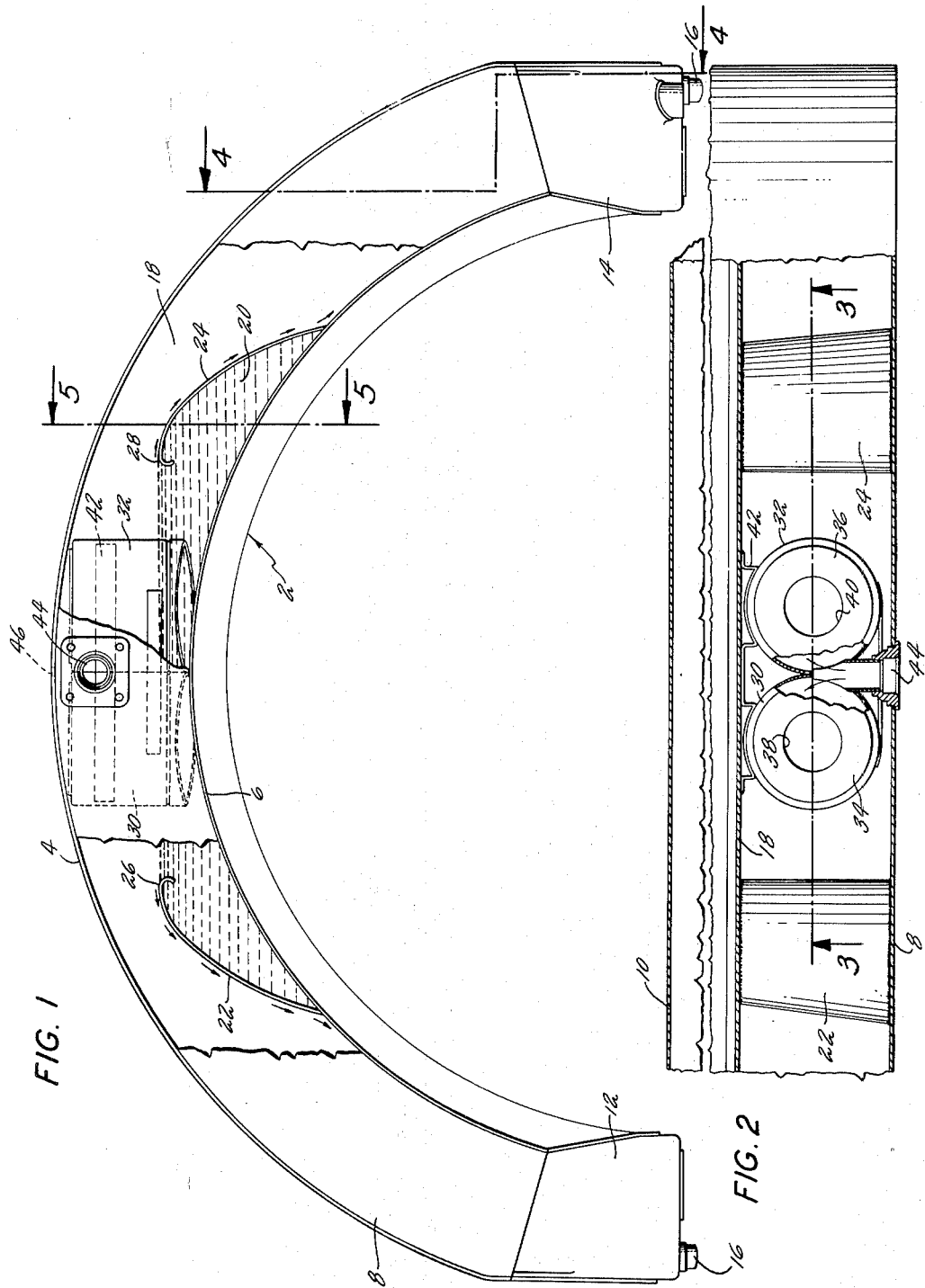

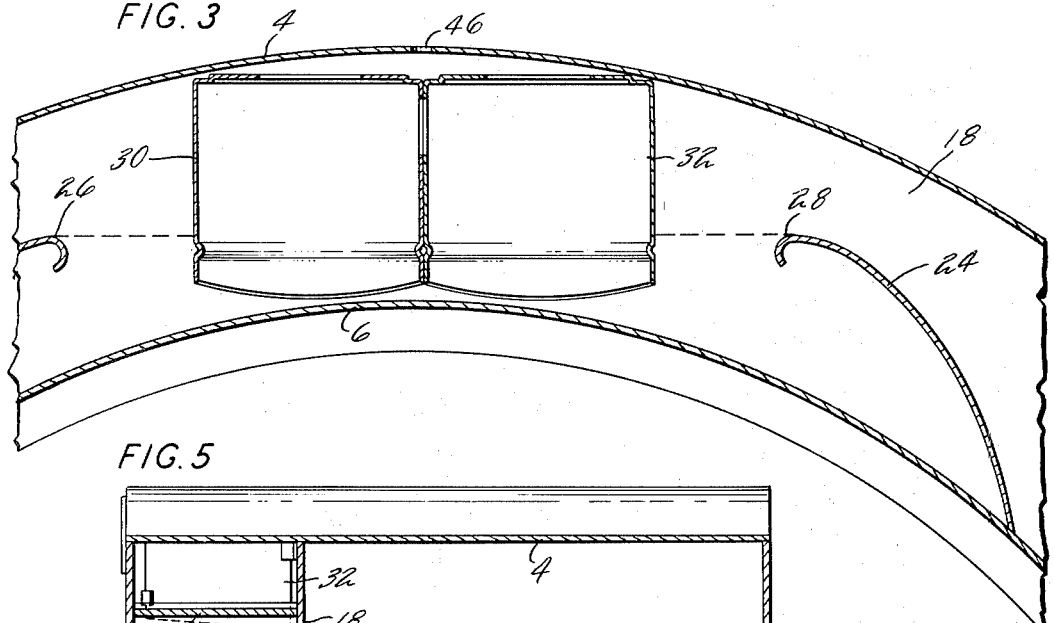
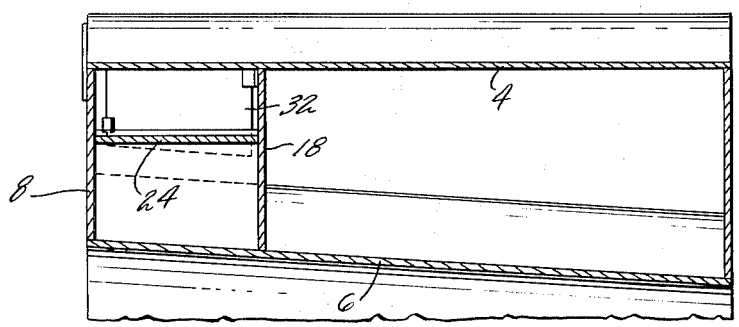
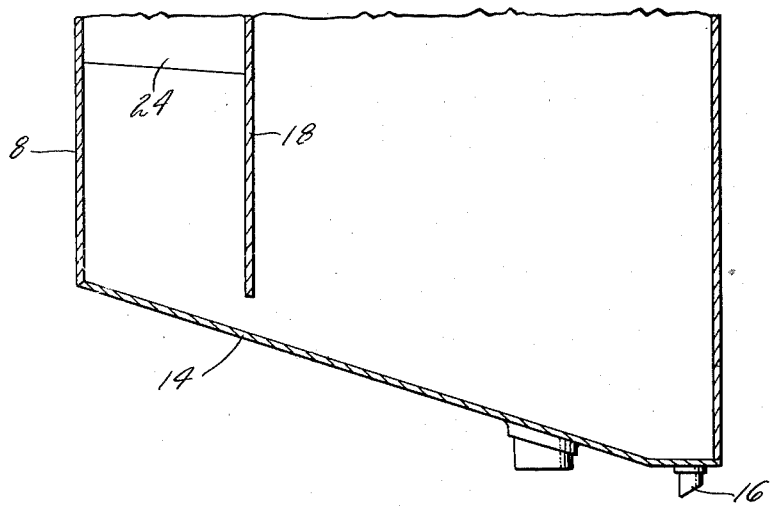
INVENTOR
THOMAS B. DOWNS
BY Charles A. Warren
ATTORNEY United States Patent Office 2,753,011
Patented July 3, 1956

DE-AERATOR AND OIL TANK

Thomas B. Downs, Willimansett, Mass., assignor to United Aircraft Corporation, East Hartford, Conn., a corporation of Delaware Application February 26, 1954, Serial No. 412,672

3 Claims. (Cl. 183—2.5)

This invention relates to a deaerator and more particularly to a combined deaerator and oil tank, for use in connection with the lubrication of aircraft engines.

One of the problems in adequate lubrication of engines is the removal of the entrained air from the oil as it is recirculated through the engine. The problem is more acute in aircraft engines where the ambient or vent pressure on the oil sump is, at altitude, much lower than sea level atmospheric pressure which results in more frothing of the oil. One feature of the invention is a compact deaerator small enough to be suitable for use in aircraft engine installations. Another feature is the arrangement of the deaerator within the oil tank for the engine.

One feature of the invention is the arrangement of an auxiliary sump within the oil tank and in conjunction with the deaerator to provide a further deaeration, with means for discharging the oil from the auxiliary sump into the main tank.

Other objects and advantages will be apparent from the specification and claims, and from the accompanying drawings which illustrate an embodiment of the invention.

Fig. 1 is an end elevation of an oil tank with parts broken away.

Fig. 2 is a fragmentary sectional view with a portion of the top of the tank removed.

Fig. 3 is a sectional view along line 3—3 of Fig. 2.

Fig. 4 is a sectional view along line 4—4 of Fig. 1.

Fig. 5 is a sectional view along line 5—5 of Fig. 1.

The invention is shown in connection with a saddle tank adapted to lie over the top of a jet engine. The tank 2 has curved substantially parallel top and bottom walls 4 and 6 connected together by a front wall 8, and a rear wall 10. The ends of the tank are closed by walls 12 and 14 which are provided with drain plugs 16. In spaced parallel relation to the front wall 8 is a baffle 18 which extends entirely across the tank except for a clearance space for the flow of oil around the baffle at each end adjacent the walls 12 and 14.

Extending between the walls 8 and 18 to form an auxiliary tank 20 adjacent the top of the tank is a pair of baffles 22 and 24 attached along the bottom edge to the bottom wall 6, having generally horizontal top edges 26 and 28 defining the top level of the auxiliary tank. The upper edges 26 and 28 are rebent as shown to form a smoothly curved top edge and the baffles extend at an angle to the vertical to provide a smooth surface over which the oil will flow without foaming into the main tank.

At the top of the tank, directly above the auxiliary tank are mounted a pair of vertical cylinders 30 and 32 which are tangential to each other. The bottom ends of the cylinders are obliquely cut as shown in Fig. 1 and are positioned below the level of the tops of the baffles so that when the auxiliary sump is filled with oil the bottom edges of the cylinders will be submerged. The top ends of the cylinders have covers 34 and 36 each with small diameter central openings 38 and 40. The cylinders may be held in place by a bracket 42.

An inlet nozzle 44 is mounted in the front wall 8 at a point below the tops of the cylinders and extends through the walls of the cylinders as shown, in a direction tangent to the two cylinders and substantially at right angles to the axes of the cylinders for the discharge of oil tangentially onto the inside walls of the cylinders. Oil under pressure is supplied through the nozzle and the centrifugal action within the cylinders will separate the entrained air from the oil. The oil flows smoothly down the walls of the cylinders and the air escapes through the openings in the tops of the cylinders and thence out a vent 46 in the top wall 4. The auxiliary tank acts as a small settling tank, and as it fills the overflow is discharged smoothly without foaming over the crest of the baffle 22 or 24 and down the outer surface of the baffle into the main tank.

This arrangement with the dual deaerator makes a compact arrangement which may be incorporated within the main oil tank without increasing its dimension and which will effectively deaerate the oil as it is pumped from the scavenge chambers in the engine.

It is to be understood that the invention is not limited to the specific embodiment herein illustrated and described, but may be used in other ways without departure from its spirit as defined by the following claims.

I claim:

1. A tank for oil having a sloping bottom wall and also having a baffle therein engaging with the bottom wall at a point between the upper and lower ends of the bottom wall to define an auxiliary sump within the tank above the lowermost part thereof, and deaerating means in the form of a cylinder positioned within the tank on substantially a vertical axis, the lower end of the cylinder being in the auxiliary sump and below the top edge of the baffle, and nozzle means for admitting fluid into said cylinder tangentially to the wall thereof, said baffle having a substantially horizontal top edge with the outer surface of the baffle forming a downwardly sloping surface merging with the bottom wall of the tank over the surface of which oil may flow from the auxiliary sump to the main tank.

2. A tank for oil, said tank being saddleshaped to fit over an engine, said tank having a baffle therein to define an auxiliary sump within and adjacent to the top of the tank, the top edge of the baffle being substantially above the bottom of the tank, and deaerating means in the form of a cylinder positioned within and adjacent to the top of the tank on substantially a vertical axis, the lower end of the cylinder being below the top edge of the baffle and within the sump, and nozzle means for admitting fluid into said cylinder tangentially to the wall thereof, said baffle having a substantially horizontal top edge, the outer surface of the baffle forming a downwardly sloping surface the lower edge of which merges gradually with the wall of the tank and over which the oil may flow to the main tank.

3. A tank for oil, said tank being substantially saddleshaped in transverse cross section and approximately rectangular in longitudinal cross section, said tank having adjacent the top at one end a pair of cylinders substantially tangent to each other and on parallel substantially vertical axes, said cylinders extending nearly the height of the tank at the point where they are located, a nozzle for delivering fluid to the interior of said cylinders at a point where they are tangent, the bottom ends of the cylinders opening into the tank, a baffle extending transversely of the tank adjacent to said pair of cylinders, another baffle extending from the first baffle to the adjacent end wall said baffles and adjacent end wall defining an auxiliary sump below the cylinders, the top edge of the baffle being above the level of the bottom ends of the cylinders.

References Cited in the file of this patent

UNITED STATES PATENTS

| | | |
|---|---|---|
| 1,095,463 | Kieser | May 5, 1914 |
| 1,095,478 | Strohbach | May 5, 1914 |
| 2,457,959 | Walker | Jan. 4, 1949 |
| 2,610,697 | Lovelady et al. | Sept. 16, 1952 |
| 2,664,963 | Lovelady et al. | Jan. 5, 1954 |
| 2,678,699 | Fowler | May 18, 1954 |